3,305,347
BENZYLIDENE HYDRAZINE PESTICIDES
Pasquale Paul Minieri, Woodside, N.Y., assignor to Tenneco Chemicals, Inc., a corporation of Delaware
No Drawing. Filed Nov. 12, 1964, Ser. No. 410,775
10 Claims. (Cl. 71—2.3)

This invention relates to pesticidal compositions and to their use in the control of the growth of various plant and animal pests. More particularly, it relates to the use in the control of the growth of undesirable plants, insects, mites, and fungi of pesticidal compositions that contain substituted benzylidene hydrazines as their active ingredient.

In accordance with this invention, it has been discovered that certain substituted benzylidene hydrazines have unusual and valuable activity as herbicides, as insecticides, as miticides, and as fungicides. These compounds may be represented by the structure

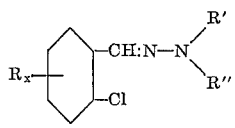

wherein R represents chloro, nitro, amino, lower alkyl, or lower alkoxy groups or mixtures thereof; R' and R" represent hydrogen atoms or lower alkyl groups or taken together represent the group

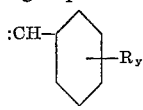

$x$ represents an integer in the range of 1 to 4; and $y$ represents an integer in the range of zero to 5. The preferred compounds for use in pesticidal compositions are the benzylidene hydrazines and bis (benzylidene) hydrazines having chlorine atoms in the 2-, 3-, and 6- positions of the aromatic rings and optionally one of the aforementioned substituents in the 5-positions of the rings.

Illustrative of the novel compounds are the following:

2,6-dichlorobenzylidene hydrazine,
2,5-dichlorobenzylidene hydrazine,
2,3,6-trichlorobenzylidene hydrazine,
2,3-dichloro-6-methylbenzylidene hydrazine,
2-methyl-3,6-dichlorobenzylidene hydrazine,
2,3,5,6-tetrachlorobenzylidene hydrazine,
2,3,6-trichloro-5-nitrobenzylidene hydrazine,
2,3,6-trichloro-5-aminobenzylidene hydrazine,
2-methoxy-3,5,6-trichlorobenzylidene hydrazine,
2-methyl-3,5,6-trichlorobenzylidene hydrazine,
2,3,4,5,6-pentachlorobenzylidene hydrazine,
N-dimethyl-2,3,6-trichlorobenzylidene hydrazine,
N-dibutyl-2,3,6-trichlorobenzylidene hydrazine,
bis(2,6-dichlorobenzylidene) hydrazine,
bis(2,3,6-trichlorobenzylidene) hydrazine,
bis(2,3-dichloro-6-methylbenzylidene) hydrazine,
bis(2-methyl-3,6-dichlorobenzylidene) hydrazine,
bis(2-methoxy-3,6-dichlorobenzylidene) hydrazine,
bis(2,3,5,6-tetrachlorobenzylidene) hydrazine,
bis(2,3,6-trichloro-5-nitrobenzylidene) hydrazine,
bis(2-methoxy-3,5,6-trichlorobenzylidene) hydrazine,
(2,3,4,5,6-pentachlorobenzylidene) (2,3,6-trichlorobenzylidene) hydrazine,
(2,3,6-trichlorobenzylidene) benzylidene hydrazine,
(2,3,6-trichlorobenzylidene) (2,3,6-trichloro-5-nitrobenzylidene) hydrazine,
(2,3,6-trichlorobenzylidene)(2,3,6-trichloro-5-aminobenzylidene) hydrazine, and the like.

The substituted benzylidene hydrazines of this invention may be prepared by any convenient procedure. For example, they may be prepared by reacting the appropriate substituted benzaldehyde with hydrazine hydrate or hydrazine sulfate.

The pesticides of this invention may be applied to a wide variety of plants, insects, fungi, and other pests to control or inhibit their growth. While each of the substituted benzylidene hydrazines has been found to be useful in the control of the growth of certain of the aforementioned pests, the particular type of organism upon which each exerts its major effect is largely dependent upon the number and the nature of the substituents on the aromatic ring(s). Thus it has been found that bis(2,3,6-trichlorobenzylidene) hydrazine is most effective as a selective herbicide, while 2,3,6-trichlorobenzylidene hydrazine is valuable as an insecticide, as a miticide, and as a fungicide.

The locus in which pest control is to be effected may, if desired, be treated with the compounds of this invention. Alternatively, these compounds may be applied directly to the undesirable organisms to control or inhibit their growth.

While the substituted benzylidene hydrazines may be used as such in the processes of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fuller's earth, talc, diatomaceous earth, hydrated calcium silicate, kaolin, and the like to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water or as oil-in-water emulsions. The concentration of the substituted benzylidene hydrazines in the pesticidal compositions may vary within wide limits and depends upon a number of factors, the most important of which are the type or types of organisms being treated and the rate at which the composition is to be applied. In most cases the composition contains approximately 0.1% to 85% by weight of one or more of the aforementioned substituted benzylidene hydrazines. If desired, other pesticidal compounds may also be present in the compositions.

To achieve satisfactory pest control, the compositions are usually used at a rate that will apply approximately 0.5 pound to 30 pounds and preferably 2 pounds to 10 pounds of the pesticidal compound per acre.

The invention is illustrated by the examples that follow. It is to be understood, however, that the examples are given solely for the purpose of illustration and that the invention is not limited to any of the specific materials or conditions mentioned therein except as set forth in the accompanying claims.

*Example 1*

A mixture of 32 grams (0.64 mole) of hydrazine hydrate and 38.4 grams (0.183 mole) of 2,3,6-trichlorobenzaldehyde was heated at its reflux temperature (110°–115° C.) for 5 minutes and then cooled to room temperature. The product was isolated and recrystallized from ethanol. There was obtained 34.4 grams of 2,3,6-trichlorobenzylidene hydrazine which melted at 127.5–128° C. and contained 49.3% Cl (calculated for $C_7H_5Cl_3N_2$, 47.7% Cl).

*Example 2*

A mixture of 23.4 grams (0.18 mole) of hydrazine sulfate, 50 grams (0.23 mole) of 2,3,6-trichlorobenzaldehyde, 83.5 ml. of water, and 335 ml. of ethanol was heated at its reflux temperature for 90 minutes and then cooled to room temperature. The product was isolated and recrystallized from ethanol. There was obtained a 68% yield of bis(2,3,6-trichlorobenzylidene) hydrazine, which melted at 155°–157° C. and contained 50.5% Cl (calculated for $C_{14}H_6Cl_6N_2$, 51.3% Cl).

Example 3

A mixture of 36.7 grams (0.175 mole) of 2,3,6-trichlorobenzaldehyde, 10.8 grams (0.175 mole) of 1,1-dimethylhydrazine, and 300 ml. of ethanol was heated at its reflux temperature for 90 minutes and then cooled to room temperature. Upon removal of the ethanol by vacuum distillation, there was obtained a 94.3% yield of N-dimethyl-2,3,6-trichlorobenzylidene hydrazine which contained 10.67% N (calculated for $C_9H_9Cl_3N_2$, 11.1% N).

Example 4

Groups of greenhouse flats containing soil were planted with seeds of various crop and weed species. In the pre-emergence tests, flats were sprayed with a 0.3% solution in benzene of a substituted benzylidene hydrazine. In the postemergence tests, the plants were sprayed with the same solution 2 to 4 weeks after planting. The solutions were applied to the soil or to the plants at rates ranging from 2.5 pounds to 20 pounds of the herbicidal compound per acre. In each case the results were observed 2 weeks after the application of the herbicidal composition. In Table I the effectiveness of the herbicidal compound, as determined by comparison with untreated plantings, is indicated by the numbers "0" through "10" in increasing order of effectiveness. The "0" indicates no herbicidal activity; "1" to "3", slight injury; "4" to "6," moderate injury; "7" to "9," severe injury; and "10," destruction of all plants.

p.p.m. to plants infested with various foliar pathogens, the following fungus control was achieved.

| Fungus | Percent Control | Plant Injury |
|---|---|---|
| Late Blight of Tomatoes | 58.8 | Slight. |
| Powdery Mildew of Cucumbers | 57.9 | Slight hormone effect. |
| Leaf Rust of Wheat | 44.4 | Do. |

What is claimed is:

1. The method of controlling the growth of undesirable plants, insects, mites and fungi which comprises treating the locus where control is to be effected with a pesticidal amount of a compound having the structure

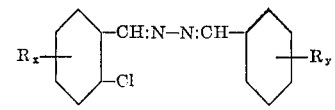

wherein each R represents a number selected from the group consisting of chloro, nitro, amino, lower alkyl, lower alkoxy, and mixtures thereof; $x$ represents an integer in the range of 1 to 4; and $y$ represents an integer in the range of zero to 5.

2. The method of claim 1 wherein the pesticide is bis(2,3,6-trichlorobenzylidene) hydrazine.

3. The method of claim 1 wherein the pesticide is bis(2,6-dichlorobenzylidene) hydrazine.

4. The method of controlling the growth of undesirable plants, insects, mites, and fungi which comprises

TABLE I.—HERBICIDAL ACTIVITY OF SUBSTITUTED BENZYLIDENE HYDRAZINES

| Compound | Emergence | Rate of Application (Lbs./Acre) | Plant Species | | | | | | | | | | | |
|---|---|---|---|---|---|---|---|---|---|---|---|---|---|---|
| | | | Corn | Wheat | Oats | Soybeans | Clover | Onions | Foxtail | Ryegrass | Crabgrass | Mustard | Buckwheat | Morning Glory |
| 2,6-dichlorobenzylidene hydrazine. | Pre | 10 | 0 | 0 | 0 | 0 | 6 | 10 | 0 | 0 | 0 | 6 | 0 | 8 |
| | Post | 10 | 0 | 3 | 2 | 9 | 5 | 0 | 0 | 0 | 5 | 10 | 5 | 9 |
| 2,3,6-trichlorobenzylidene hydrazine. | Pre | 10 | 8 | 2 | 3 | 10 | | 5 | 0 | 0 | 0 | 8 | 0 | |
| | Post | 10 | 0 | 3 | 2 | 5 | | 3 | 0 | 0 | 5 | 9 | 3 | |
| N-dimethyl-2,3,6-trichlorobenzylidene hydrazine. | Pre | 10 | 8 | 8 | 8 | 10 | 10 | | 10 | 8 | 10 | 10 | 5 | 10 |
| | | 5 | 8 | 7 | 7 | 10 | 9 | | 8 | 8 | 9 | 10 | 4 | 7 |
| | | 2.5 | 0 | 6 | 7 | 10 | 7 | | 5 | 5 | 8 | 9 | 0 | 0 |
| | Post | 10 | 8 | 2 | 2 | 8 | 8 | | 8 | 1 | 9 | 10 | 5 | 5 |
| | | 5 | 5 | 2 | 4 | 7 | 5 | | 5 | 5 | 8 | 9 | 0 | 0 |
| | | 2.5 | 4 | 3 | 4 | 5 | 3 | | 0 | 0 | 0 | 9 | 2 | 4 |
| Bis(2,6-dichlorobenzylidene) hydrazine. | Pre | 10 | 0 | 2 | 4 | 5 | | 0 | 0 | 0 | 0 | 5 | 0 | 8 |
| | Post | 10 | 0 | 0 | 0 | 2 | | 0 | 0 | 0 | 0 | 0 | 0 | 0 |
| Bis(2,3,6-trichlorobenzylidene) hydrazine. | Pre | 20 | 0 | 4 | 7 | 8 | 4 | 5 | 2 | 0 | 7 | 10 | 0 | 3 |
| | | 10 | 1 | 0 | 0 | 9 | 8 | 8 | 8 | 0 | 8 | 10 | 5 | 10 |
| | | 5 | 0 | 4 | 8 | 8 | 0 | 0 | 0 | 0 | 0 | 9 | 0 | 9 |
| | | 2.5 | 0 | 0 | 0 | 0 | 0 | 0 | 0 | 0 | 0 | 0 | 0 | 10 |
| | Post | 20 | 5 | 1 | 2 | 9 | 10 | 9 | 9 | 3 | 7 | 10 | 8 | 9 |
| | | 10 | 5 | 1 | 1 | 7 | 7 | 7 | 10 | 0 | 5 | 10 | 5 | 8 |
| | | 5 | 5 | 1 | 1 | 5 | 4 | 0 | 7 | 0 | 3 | 5 | 3 | 2 |
| | | 2.5 | 0 | 0 | 0 | 0 | 0 | 0 | 0 | 0 | 0 | 7 | 0 | 5 |

Example 5

In a series of experiments in which 2,3,6-trichlorobenzylidene hydrazine was applied at the rate of 1000 p.p.m. to plants infested with various pests, the following control was achieved.

| Organism | Percent Control | Plant Injury |
|---|---|---|
| Mexican Bean Beetle | 64.3 | None. |
| Southern Armyworm | 53.3 | Do. |
| Pea Aphid | 93.8 | Do. |
| Two-spotted Spider Mite | 100.0 | Do. |

Example 6

In a series of experiments in which 2,3,6-trichlorobenzylidene hydrazine was applied at the rate of 1000 contacting said organisms with a pesticidal amount of a compound having the structure

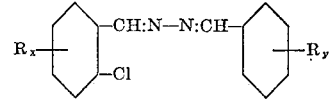

wherein each R represents a member selected from the group consisting of chloro, nitro, amino, lower alkyl, lower alkoxy, and mixtures thereof; $x$ represents an integer in the range of 1 to 4; and $y$ represents an integer in the range of zero to 5.

5. The method of claim 1 wherein the pesticide is bis(2,6-dichlorobenzylidene) hydrazine.

6. The method of claim 1 wherein the pesticide is bis(2,3,6-trichloro-benzylidine) hydrazine.

7. The method of controlling the growth of undesirable insects, mites, and fungi which comprises contacting said organisms with a pesticidal amount of a compound having the structure

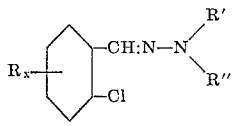

wherein R represents a member selected from the group consisting of chloro, nitro, amino, lower alkyl, lower alkoxy, and mixtures thereof; R' and R" represent members selected from the group consisting of hydrogen atoms and lower alkyl groups; and $x$ represents an integer in the range of 1 to 4.

8. The method of claim 7 wherein the pesticide is 2,6-dichloro-benzylidene hydrazine.

9. The method of claim 7 wherein the pesticide is 2,3,6-tricholorbenzylidene hydrazine.

10. The method of claim 7 wherein the pesticide is N-dimethyl-2,3,6-trichlorobenzylidene hydrazine.

References Cited by the Examiner

UNITED STATES PATENTS

| | | | |
|---|---|---|---|
| 2,403,495 | 7/1946 | Bowen | 167—30 |
| 2,703,751 | 3/1955 | Sharp | 71—2.3 |
| 2,758,053 | 8/1956 | Smith | 167—30 |
| 2,966,517 | 12/1960 | Hauptschein | 260—566 |
| 3,000,903 | 9/1961 | Biel | 260—569 |
| 3,067,252 | 12/1962 | Neureiter | 260—566 |
| 3,178,476 | 4/1965 | Hegedus | 260—569 |
| 3,197,504 | 7/1965 | Harvey | 71—2.3 |

JULIAN S. LEVITT, *Primary Examiner.*

JEROME D. GOLDBERG, *Assistant Examiner.*